June 25, 1957 A. Y. KAPLAN ET AL 2,796,815
REFLECTOR ATTACHMENT FOR AUTOMATICALLY DEPRESSING
THE OPTICAL AXIS OF A GUN CAMERA
Filed Sept. 19, 1952 2 Sheets-Sheet 1
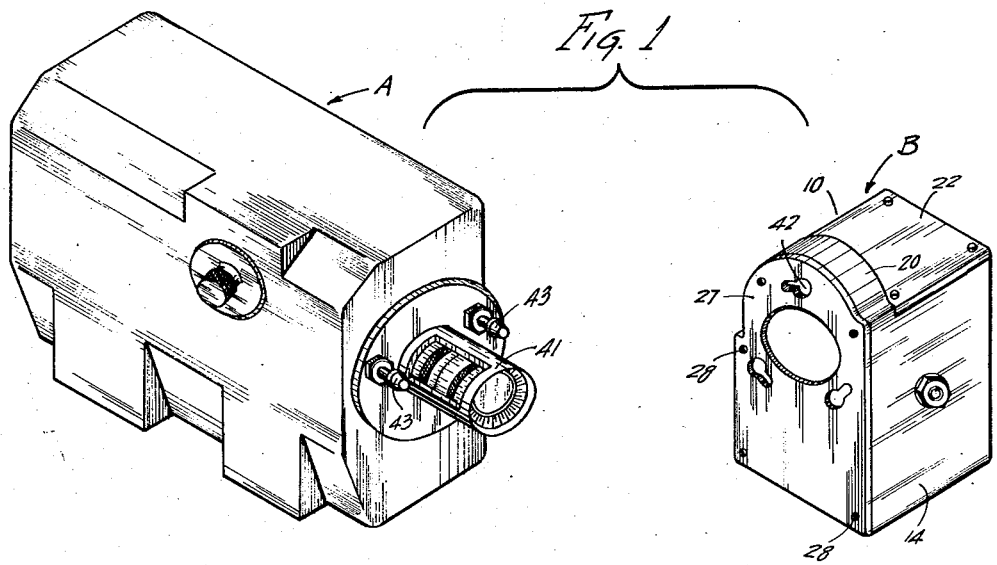
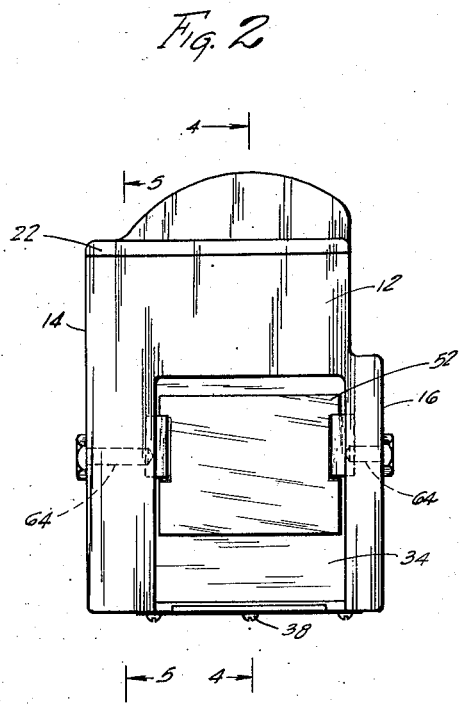
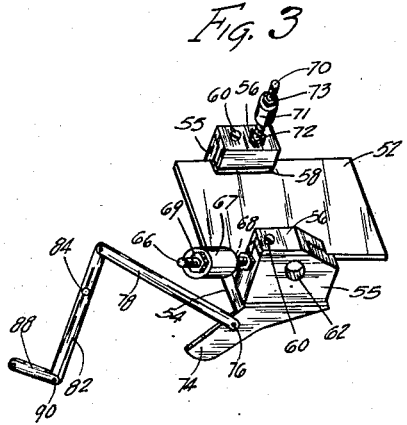
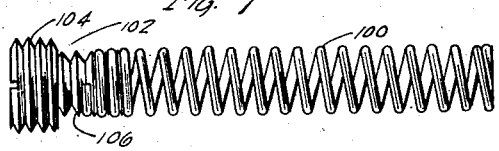
INVENTORS
ARTHUR Y. KAPLAN
DONALD A. HOYT
FRANK E. SMITH
ROBERT W. TAFEL
DOMENIC F. TAVANI
EDWARD CHRISTIAN
DAVID E. WEISS
BY
ATTORNEYS June 25, 1957 A. Y. KAPLAN ET AL 2,796,815
REFLECTOR ATTACHMENT FOR AUTOMATICALLY DEPRESSING
THE OPTICAL AXIS OF A GUN CAMERA
Filed Sept. 19, 1952 2 Sheets-Sheet 2
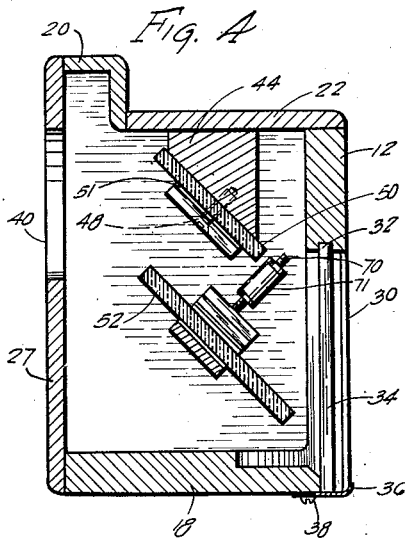
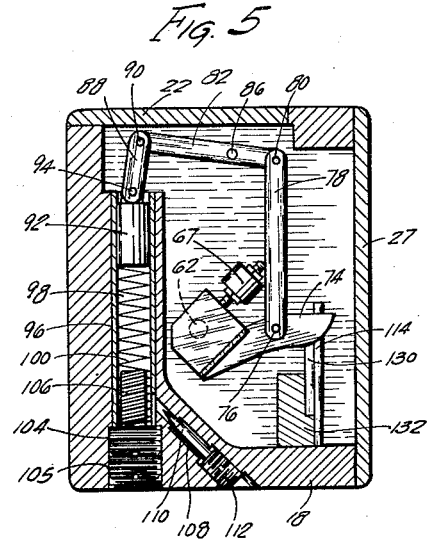
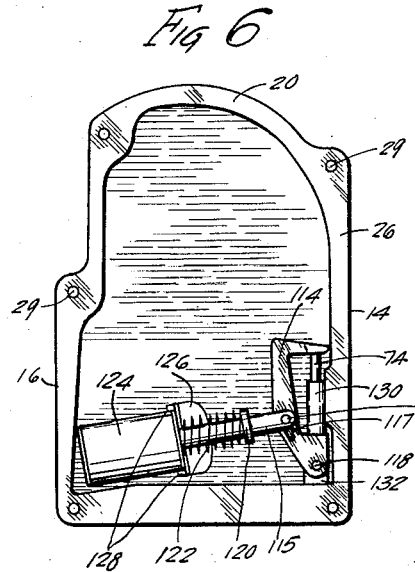
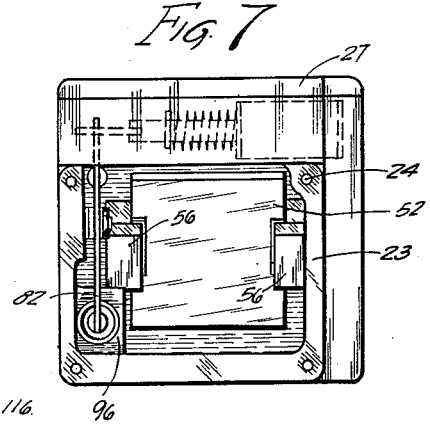
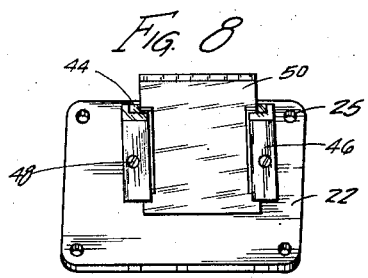
INVENTORS
ARTHUR Y. KAPLAN
DONALD A. HOYT
FRANK E. SMITH
ROBERT W. TAFEL
DOMENIC F. TAVANI
EDWARD CHRISTIAN
DAVID E. WEISS
BY
ATTORNEYS

United States Patent Office 2,796,815
Patented June 25, 1957

2,796,815

REFLECTOR ATTACHMENT FOR AUTOMATICALLY DEPRESSING THE OPTICAL AXIS OF A GUN CAMERA

Arthur Y. Kaplan, Donald A. Hoyt, and Frank E. Smith, Philadelphia, Robert W. Tafel, Drexel Hill, and Domenic F. Tavani, Edward Christian, and David E. Weiss, Philadelphia, Pa., assignors to the United States of America as represented by the Secretary of the Navy Application September 19, 1952, Serial No. 310,568

1 Claim. (Cl. 95—12.5)

(Granted under Title 35, U. S. Code (1952), sec. 266)

The invention described herein may be manufactured and used by or for the Government of the United States of America for governmental purposes without the payment of any royalties thereon or therefor.

This invention relates to an attachment for a gun camera and particularly to an attachment which automatically adjusts the optical axis of the camera when an airplane, in which the gun camera is positioned, pulls out of a dive.

It is of prime importance that when a military or naval airplane makes an attack on either a ground or air target, the point of impact of the missile on the target or the absence of impact be recorded. This is necessary both from an intelligence and a tactical point of view. From an intelligence point of view it is necessary to know whether the target has been destroyed or damaged so that it may be determined what losses have been sustained by the enemy and whether additional attacks on the same target are necessary. From a tactical point of view, it is desirable to study the results of certain types of attack procedures and to evaluate them so that changes and improvements in such procedures may be made if found necessary. Many difficulties have arisen, however, in regard to photographing the impact of an aerial missile on a target because a fighter plane, which is generally the type of plane with which such attacks are made, has its guns, rocket tubes, or other firing devices fixedly mounted thereon, and the pilot aims his guns by aiming the plane at the target. The plane dives or zooms toward its target and, at a certain distance away from the target, fires its guns. The plane, thereafter, immediately pulls out of its former course and away from the target. The plane, in this case, generally zooms up away from the line of flight of the missile, and because of the great speeds attained by modern fighter planes, the plane pulls up out of the missile's line of flight before the missile reaches its target. This is particularly true when rockets are being used as the missiles, since rockets are slower in reaching the target than are machine-gun bullets or cannon shells. Therefore, when the gun camera is mounted in line with the guns or rocket tubes, as must generally be the case, the camera is no longer pointed toward the target when the missile completes its flight path and the resultant photographs are militarily worthless.

It is, therefore, one object of this invention to provide a gun camera attachment for an airplane or the like which automatically adjusts its optical axis when the airplane changes its course.

Another object of this invention is to provide an attachment for gun cameras for airplanes or the like which is adapted to aid the camera in recording the impact of a rocket or other missile against a target.

Another object of this invention is to provide an attachment for airplane gun cameras which permits the optical axis of the camera to be shifted by the acceleration of gravity.

Another object of this invention is to provide an attachment for an airplane gun camera which is simple, compact and easy to manufacture and which is adapted to be attached to the camera without any substantial modification of the camera.

Other objects and many of the attendant advantages of this invention will be readily appreciated as the same becomes better understood by reference to the following detailed description when considered in connection with the accompanying drawings wherein:

Fig. 1 is a perspective view showing the camera and the attachment before being joined.

Fig. 2 is a front elevational view of the attachment.

Fig. 3 is a perspective view of the pivoted mirror and its related parts.

Fig. 4 is a sectional view taken on line 4—4 of Fig. 2.

Fig. 5 is a sectional view taken on line 5—5 of Fig. 2.

Fig. 6 is a view of the interior of the housing with the rear wall removed and showing the latch mechanism therein.

Fig. 7 is a top plan view of the attachment with the top cover removed.

Fig. 8 is a perspective view of the top cover and fixed mirror.

Fig. 9 is an elevational view of the accelerometer spring and its retainer.

Referring now in greater detail to the drawings wherein similar reference characters refer to similar parts, there is shown in Fig. 1 a gun camera A and an attachment B which is adapted to be mounted on the lens barrel of the camera. The attachment B comprises a housing 10 having integrally formed side and bottom walls as at 12, 14, 16 and 18 and having a partially extending curved top wall 20 also integral therewith. A top cover 22 is adapted to removably cover the opening formed by the partial extension of wall 20. An off-set flange 23 is provided on the periphery of the housing around the top opening and threaded openings 24 are provided in the flange to receive therein attaching screws threaded through openings 25 in the top cover 22. An off-set flange 26 is formed around the rear periphery of the integral housing section so that the flange constitutes an attaching means for the removable back plate 27. Screws 28 extend through corresponding threaded openings 29 in the back plate and in the flange 26, to hold the back plate on the housing.

An opening 30 is formed in the front section of the housing and this opening is provided with a peripheral groove 32 for receiving a window glass 34 therein. A bent plate 36, connected to the bottom wall 18 by screws 38, holds the window glass in position. An opening 40 is provided in the upper portion of the back plate 27 for the purpose of receiving the lens barrel 41 of the gun camera. Bayonet slots 42 are provided in the back plate surrounding the opening 40 for the purpose of receiving therein locking pins 43 on the camera.

The top cover 22 is provided with an integrally formed hanger member 44 having a recess at its free end for receiving a mirror 50 therein. A pair of oppositely positioned bent clamping plates 46 are connected to the member 44 by means of screws 48. When these screws are loosened, the mirror is released and can be removed, but when it is desired to clamp the mirror into fixed position, the screws are tightened, thereby clamping the mirror between the member 44 and the plates 46. A fibre pad 51 is provided between the mirror and the clamping plates to protect the mirror surface. It should be noted that the mirror holding end of the hanger member 44 is slanted at a predetermined angle, which is the fixed angle of the mirror 50.

Within the housing 10, vertically spaced from the mirror 50 when the cover 22 is in position, is a pivotally movable mirror 52. The mirror 52 is clamped in a cradle 54 which is provided with upstanding portions 55 at each end. A clamping block 56 abuts against the top of each portion 55, clamping the mirror 52 between the blocks and the cradle. A fibre pad 58 is provided between each block 56 and the mirror. A screw 60 holds each block 56 against its corresponding member 55. Each of the upstanding members 55 is further provided with a bearing opening 62 to receive a pivot pin 64, one of which is mounted in wall 14 and the other of which is mounted in wall 16 of the housing. A threaded stem 66 is provided on one of the members 55 in a position parallel to the mirror 52 and a weight 67, having a bore therein to receive the stem, is mounted thereon. A nut 68 is provided on the stem to hold it in position. Nuts 69 are provided at either side of the weights to hold the weight in adjusted position on the stem. Similarly, a threaded stem 70 is provided on the block 56 which is opposite to the block adjacent the weight 67. This stem 70 extends perpendicular to the mirror 52 and has slidably mounted thereon a weight 71. A nut 72 holds the stem 70 in position and nuts 73 hold the weight 71 in adjusted position on the stem. By means of these two adjustable weights 67 and 71, the pivotally mounted mirror 52 is adapted to be balanced around its pivotal axis.

Connected to the cradle member 54 is a lever 74 having a pivot pin 76 thereon which pivotally connects a link 78 to the lever. Pivoted to the link 78, as at 80, is a link 82 having an opening 84 therein for receiving a pivot pin 86 connected to wall 16 of the housing. A link 88 is pivotally connected to link 82 as at 90 and is pivotally connected at its other end to a weight 92 by means of pivot pin 94. The weight 92 is cylindrical in shape and of a size to slidably fit into the cylindrical bore 98 of an elongated housing 96 the bore extending through the bottom wall 18. The housing itself is square in cross-section as best shown in Fig. 5. The weight 92, which exerts a force of one g, or the equivalent of the acceleration of gravity, is counterbalanced by a coil spring 100 which is positioned within the bore 98 between the weight 92 and a threaded, cylindrical plug 102 which threadedly closes the opening in the bottom wall 18 formed by the bore 98. The plug 102 consists of a relatively wide base portion 104 and a narrower stem portion 106, both the base and the stem being threaded. The base 104 screws into the threaded and enlarged bottom portion of bore 98, while the threads on the stem 106 engage in a threaded relationship with the coils of the spring 100 as best shown in Fig. 9. By actually screwing the spring onto the stem 106, the spring can be adjusted by changing its number of active coils, and thereby changing its characteristics. This is a different method than the common method of adjusting a spring by means of changing its compression, the method used in this invention being necessary because the counterbalancing force of the spring must always be proportional to the force of the weight 92. By merely changing the number of active coils of the spring, the proportion betweeen the weight and the deflection of the spring is adjusted without changing the counterbalancing force of the spring. A plug 105 closes the bore below the base 104.

A diagonal bore 108 extends from the bottom wall 18 into the bore 98 of the housing 96, this bore 108 connecting with the bore 98 above the position assumed by the base portion 104 of the plug 102 when in closing position. The bore 108 acts as a vent port to open the bore 98 to atmosphere and the size of its opening is controlled by a needle valve 110. The valve 110 is provided with a screw-threaded portion 112 which can be reached by a screw-driver or the like from below the wall 18 for the purpose of adjusting the valve.

The combination of the housing 96, bore 98, weight 92, spring 100, plug 102 and valve-adjusted vent port 108 forms the "accelerometer" portion of the invention. This accelerometer acts on the pivoted mirror 52 through the links 78, 82 and 88 in a manner to be hereinafter explained.

The lever 74 of the pivoted mirror 52 is normally prevented from pivoting by a solenoid actuated latch means 114 mounted on the end of a stem 115 by a pin 116 and a slot 117, and pivoted at 118 to a stop means, hereinafter described. The stem 115 is provided with a flange 120 and is surrounded by a coil spring 122 which abuts against the flange 120 at one end and against the solenoid housing 124 at its other end, the stem projecting into the solenoid at that end. A terminal block 126 is provided on the solenoid and is provided with terminals 128 to receive wires for connection to a suitable source of electrical energy, not shown. A stop 130 mounted on a block 132 prevents movement of the lever 74 below a predetermined position under the force of the latch means 114.

In operation, when the attachment is connected to a gun camera on an airplane, when the guns, rocket tubes, or the like are fired during the plane's attacking maneuver, the actuation of the firing mechanism also actuates the solenoid 124 which, in turn, actuates the latch mechanism to release the lever 74. The mirror 52 is then free to pivot under the control of the accelerometer mechanism. As soon as the attack is made and the plane zooms up or otherwise changes its course, an inertia force proportional to this change of direction is developed on the weight 92, and this inertia force is added to the force of gravity already acting on the weight. This will press the weight down against the force of spring 100, thereby rocking the lever 74 and the mirror 52 around on its axis. The amount of pivotal movement attained by the mirror 52 will be proportional to the additional force, so that, although by the time the projectiles have reached their target, the plane is going in another direction, the mirror 52 will still be directed in the original direction and will reflect the light beams from the target onto the stationary mirror 50 from which, in turn, the light bears are reflected into the camera barrel.

It should be noted that as the weight 92 moves down against the force of the spring 100 within the bore 98, air is forced through the narrow bore 108 to atmosphere, this air having meantime acted as a dashpot or shock absorber. After the acceleration is restored to that of gravity and the spring 100 forces the weight 92 up, air re-enters port 108 to be available as a dashpot means for the next downward movement of weight 92. This dashpot effect is regulated by means of adjusting the needle valve 110.

Obviously many modifications and variations of the present invention are possible in the light of the above teachings. It is, therefore, to be understood that within the scope of the appended claim the invention may be practiced otherwise than as specifically described. What is claimed as the invention is:

An attachment for an airplane gun camera or the like comprising a housing adapted to be connected to the lens barrel of said camera, an opening in said housing to allow light beams to enter therein, a plurality of light reflecting elements in said housing to reflect said light beams into said lens barrel, means to pivotally mount at least one of said reflecting elements, a pair of adjustable weights secured to said mounting means, the first of said weights being parallel to the axis of the pivotally mounted reflecting element, the second of said weights being normal to said element axis, means to lock said pivotally mounted element against pivotal movement, means to unlock said pivotally mounted element, said locking means including a solenoid and a latch operatively connected to said solenoid, means to rock said pivotally mounted element on its axis when a force proportional to an acceleration greater than a predetermined acceleration acts on said last mentioned means, said rocking means including a weight sliding in a cylinder, an adjusting nut in said cylinder having a threaded extension, a spring in said cylinder secured at one end to said weight and at the opposite end screwed to the adjusting nut extension, the adjustment on said spring being made by retracting or extending the number of coils screwed on said threaded nut extension.

References Cited in the file of this patent

UNITED STATES PATENTS

| | | |
|---|---|---|
| 525,799 | Rymes | Sept. 11, 1894 |
| 1,098,956 | Miller | June 2, 1914 |
| 1,877,459 | Hayes | Sept. 13, 1932 |
| 1,948,217 | Goodwin | Feb. 20, 1934 |
| 2,135,997 | Arthuys | Nov. 8, 1938 |
| 2,184,615 | Gunther | Dec. 26, 1939 |
| 2,265,629 | Christiansen | Dec. 9, 1941 |
| 2,430,264 | Wiegant et al. | Nov. 4, 1947 |
| 2,544,686 | Jensen | Mar. 13, 1951 |
| 2,622,495 | Jensen | Dec. 23, 1952 |
| 2,623,436 | Olson | Dec. 30, 1952 |
| 2,683,001 | MacIntyre | July 6, 1954 |
| 2,766,667 | Harry et al. | Oct. 16, 1956 |

FOREIGN PATENTS

| | | |
|---|---|---|
| 219,082 | Great Britain | July 17, 1924 |
| 958,615 | France | Sept. 19, 1949 |